Sept. 16, 1969 D. A. MUSGROVE 3,466,998
BACON CRISPER
Filed Aug. 24, 1967 2 Sheets-Sheet 1
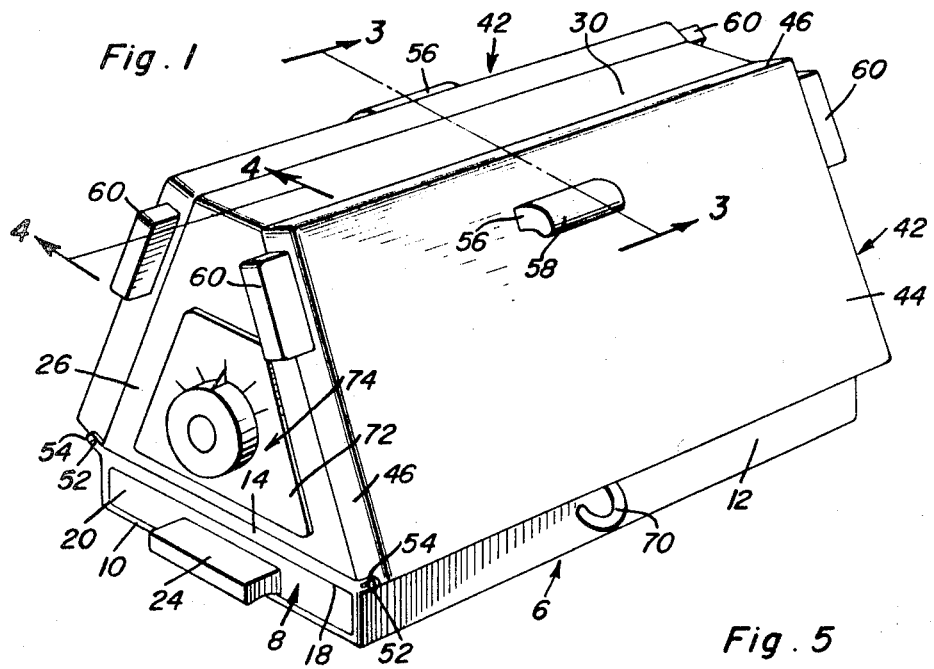
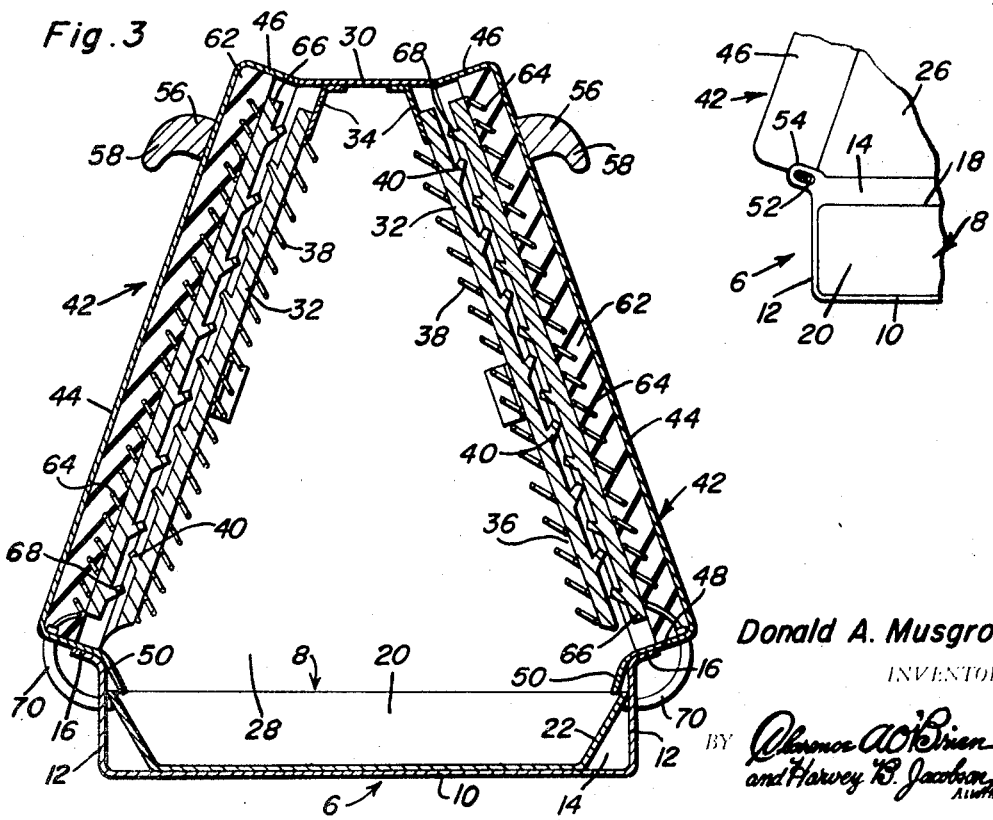
Donald A. Musgrove
INVENTOR
BY Clarence A. O'Brien
and Harvey B. Jacobson
Attorneys

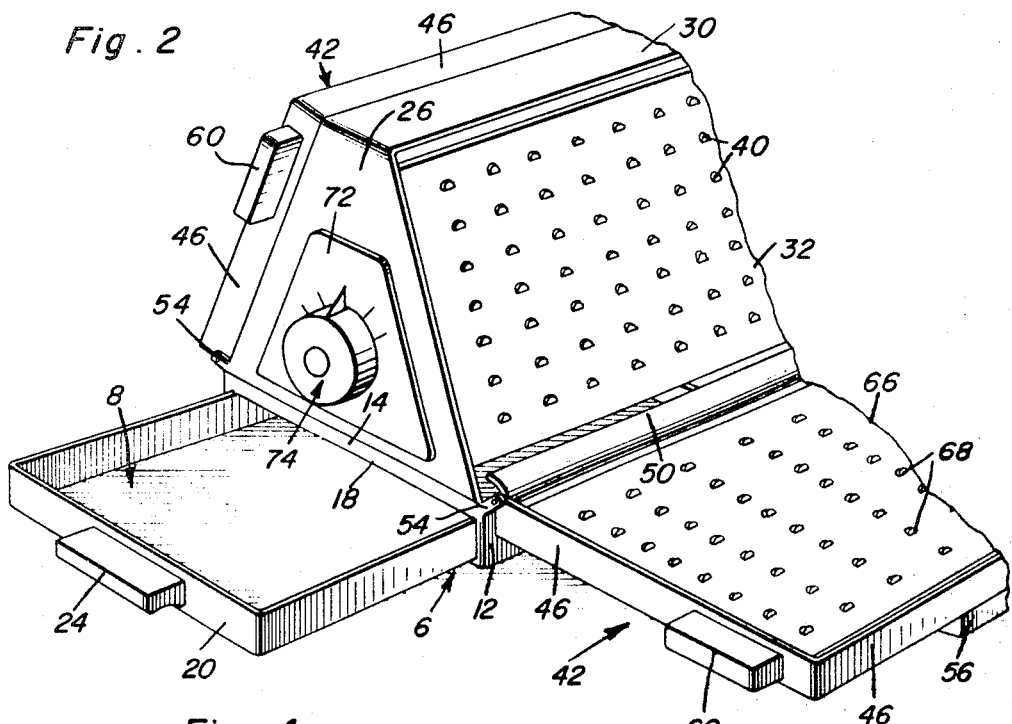
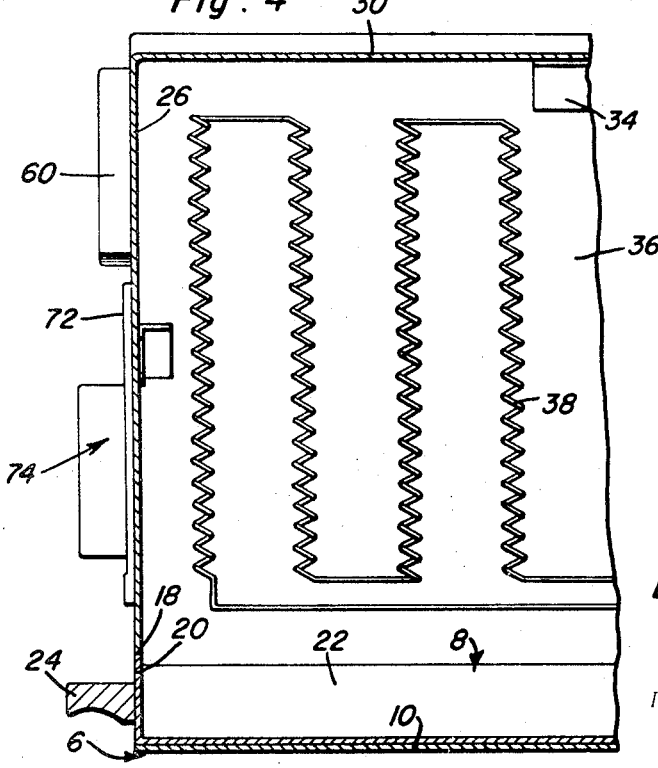
Donald A. Musgrove
INVENTOR.

United States Patent Office 3,466,998
Patented Sept. 16, 1969

3,466,998
BACON CRISPER
Donald A. Musgrove, Rte. 2, Box 85,
Winlock, Wash. 98596
Filed Aug. 24, 1967, Ser. No. 663,012
Int. Cl. A47j 37/06; H05b 3/68
U.S. Cl. 99—349                                    5 Claims

ABSTRACT OF THE DISCLOSURE

A device for home and restaurant use. It functions to flatten and broil sliced meat, for example, strips of bacon. It embodies a portable self-standing housing having a well-like receiver at its bottom containing a removable grease pan. Each of two lengthwise sides is provided with flattening grid plates with heating coils. The opposed faces of the inner and outer plates have meat piercing and retaining prongs or spikes. The outer grid plate is built into an insulated hinged cover. The plates are inclined and the gravitating grease runs and is shunted over a deflecting flange into the grease pan.

---

This invention relates to a portable housing having a receiver at its bottom containing an insertable and removable grease pan and wherein the respective longitudinal sides of the housing are provided with inclined left and right covers and paired grid plates arranged in a manner to cause the grease to flow down into said pan for disposition.

Briefly the invention is expressly, but not necessarily, designed and adapted for flattening, piercing, and supporting sliced meat products, strips of bacon for example. The construction is such that a plurality of strips of bacon or the like can be properly supported and broiled simultaneously on both sides. The housing is unique in that it is provided at the bottom thereof with a well-like base defining a receiver. This receiver serves to accommodatingly confine a slidingly mounted insertable and removable pan for collecting dripping and grease. While the broiling means may be on the left and right sides of the open sides of the housing it can be assumed, for simplicity, that at least one side is provided with a first fixedly mounted grid plate, said plate being above the plane of the receiver and pan. A complemental cover is operatively mounted on that side of the housing with the stated first grid plate. More explicitly the side of the cover which confronts the grid plate is provided with a second grid plate which is complemental to and has an inwardly facing side which can be moved toward and from the outwardly facing side of the first grid plate. The opposed sides of the respective plates have coacting projecting prongs or spurs which are designed and adapted and arranged to pierce and temporarily retain the slices of bacon or other meat in place. The plates have cooperating plate heating means on their appropriate sides. The plates have corresponding marginal edges spaced apart at the longitudinal bottom portions to permit the dropping grease to gravitate and collect in the pan for ultimate disposal or other use.

In carrying out a preferred embodiment of the invention the housing is portable and hollow and the base part is flat bottomed so that it is self-standing and is provided with surrounding or upstanding marginal walls which encompass the pan. At least one end wall has an entrance and exit slot and the handle-equipped end portion of the pan is aligned with and can be slid in and out through the slot at will.

A bacon cooking device constructed in accordance with the principles of the present invention well serves the purposes for which it is intended. It will save time and labor, will reduce undesirable smoking to an acceptable minimum, will cook the bacon not only in a flat crispy manner but will virtually reduce splattering and popping of grease to a safe and desirable degree.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a bacon crisper constructed in accordance with the principles of the invention showing the same with the hinged drawer-like covers in upwardly and inwardly closed normal positions.

FIG. 2 is a fragmentary perspective view based on FIG. 1 and showing the cover at the right swung down to bacon loading and unloading position and also showing at the left the extended slidingly mounted grease pan.

FIG. 3 is a section taken on the plane of the section line 3—3 of FIG. 1.

FIG. 4 is an enlarged fragmentary section taken on the plane of the section line 4—4 of FIG. 1.

And FIG. 5 is a fragmentary detail view of the left front corner portion of the device as seen, for example in FIG. 1.

The hollow housing is preferably of the general shape and appearance shown in FIGS. 1 and 2 for example. The horizontal bottom part of the housing is denoted generally by the numeral 6 and is approximately rectangular and provides a well-like compartment or receiver for the insertable and removable slidingly mounted grease collecting and disposal pan 8. This base or receiver has a flat self-standing bottom 10, opposed longitudinal upstanding side walls 12 and end walls 14. The upper edges of the side walls are provided with outstanding lip portions 16. One end wall 14 as shown in FIGS. 1 and 2 is provided with an opening or slot 18 by way of which the slidingly mounted pan or drawer 8 is accessible. The pan has end walls 20 and sloping side walls 22 and one end wall as shown in FIGS. 1 and 2 is provided with a suitable outstanding handgrip 24. The major housing portion above the pan and receiver is characterized by a front end wall 26 and an opposed rear end wall 28 (FIG. 3). The end walls are bridged and joined at upper portions by a horizontal relatively narrow top wall 30. The longitudinal sides of the housing are said to be open and slope outwardly and downwardly or, conversely, upwardly and inwardly. Each side is provided with grid plates and cover means. Inasmuch as the side at the right is the same as the side at the left and since it is within the purview of the concept to provide cooking means on one or both sides a description of the means on one side will suffice for both. Accordingly, the inward stationary grid plate 32 spans the open side and is bracketed or supported in place as at 34. This plate is preferably flat sided and is provided on one side as at 36 with suitable heating coils 38. The other outwardly disposed side is provided with rows of vertical and horizontal prongs or spikes 40 which in practice serve to anchor the strips of bacon (or other sliced meat) in position in what is believed to be a substantially self-evident manner. This pronged side of the grid plate is covered by a cover which is denoted generally by the numeral 42. This cover is constructed in the form of a pan or tray and has a main outer wall 44 and marginal rim walls 46 which completely surround the wall 44. The lower rim member 48 is provided with an inwardly directed grease deflecting flange 50 which is such that it overlies the lip 16 and overhangs the marginal edge portion of the grease pan in a manner to direct grease into the pan. The end rim members are such that they are hingedly mounted as at 52 on suitable slotted ears 54 to permit the cover to be swung from the normal upwardly and inwardly inclined closed position in FIG. 1 to the horizontal open loading and unloading position shown at the right in FIG. 2. The upper median portion of the wall 44 is provided with an outstanding rest 56 with a bent terminal end portion 58 which assumes a supporting position when the cover is open as shown in FIG. 2. The respective end rim members are provided with appropriate block-like handles or handgrips 60. The inwardly facing receptacle portion of this cover is provided with a filler 62 of insulation material (FIG. 3). This insulation material has heating coils 64 appropriately arranged and embedded therein. Also the inward side of the insulation is provided with a second grid plate 66 which confronts and is accordingly opposed to the first-named stationary grid plate 32. The plate 66 is also provided with piercing prongs 68 which are properly arranged in rows vertically and horizontally to properly coincide with the aforementioned prongs 40. The conductor for the wiring, that is the heating coils, is denoted generally at 70 in FIG. 3.

In actual practice the front end wall 26 may be provided with an adapter plate 72 which is positioned and mounted as illustrated in FIGS. 1 and 2. This plate is provided with a rotatably mounted timer 74 of suitable construction.

The automatic control or timer 74 will be of any desired type so that it is possible for the user to regulate or set the time for broiling the bacon or other product ranging from light to medium to crisp. In actual practice all that is necessary is to open the cooker so that the cover at the right in FIG. 2 is in the loading position. The strips or rashers of bacon are laid flatwise and retained in place by the prongs or spikes on the outer grid plate 66. Then the cover is swung up from the down position to the upwardly and inwardly inclined closed position shown in FIGS. 1 and 3. When the heat is turned on it is evident that the bacon which is virtually clamped between the grid plates will be simultaneously cooked on both sides. It is submitted that this device will save much time for housewives and chefs in not having to watch the bacon while it is cooking. Objectionable splattering and spilling of grease and burns from hot grease are virtually eliminated when using the herein disclosed device. Accordingly, it is reiterated that the invention will serve the purposes for which it is intended and that a more extended description is deemed to be unnecessary.

What is claimed as new is as follows:

1. A device for broiling a plurality of strips of bacon or the like comprising a hollow portable housing embodying an elongate dwell-like base having a self-standing bottom wall surrounded by upstanding marginal side and end walls, one end wall having an exit and entrance slot, said housing having a body portion rising above the level of said base and embodying vertical end walls having upper ends joined by a horizontal top wall and having upwardly and inwardly sloping side walls, at least one side wall embodying a first grid plate fixedly mounted above the plane of said base, said grid plate being inclined upwardly and inwardly and having electric heating coils on an inward side and projecting prongs on an exterior side for temporarily piercing and suspending strips of bacon, a correspondingly inclined cover opposed to an outwardly facing side of said grid plate and having a lower edge portion hingedly mounted, said cover containing a filler of insulation material having a second grid plate superimposed thereon and heating coils interposed between said second grid plate and insulation filler, said second grid plate being likewise inclined and complemental to and having an inwardly facing side provided with projecting prongs like the first-named prongs and capable of being moved toward and from said first prongs in a manner to position the bacon strips between the plates for simultaneously broiling both sides of the strips, said base defining a receiver and a grease pan slidingly mounted in said receiver and aligned with and accessible for use by way of said slot.

2. The device defined in and according to claim 1, and wherein said cover has a lower marginal edge provided with a grease receiving and deflecting flange, said flange underlying and bridging the space between the marginal edges of said grid plates and being directed toward and overhanging a coacting edge portion of the receptacle of said pan.

3. The device defined in and according to claim 2 and wherein said cover can (1) be swung up toward said first plate and (2) swung outwardly and away from said first plate to assume a horizontal loading and unloading position, said cover having handgrips for easy handling and being provided on a central upper edge portion with a fixed rest which is adapted to reside atop a table or other support surface when the cover is in an open generally horizontal loading or unloading position.

4. A device for broiling a plurality of strips of bacon or the like comprising a hollow housing embodying an elongated upwardly opening well-like base having a bottom wall surrounded by upstanding marginal side and end walls, the well portion of said base defining a receiver, and a grease pan removably mounted in said receiver, said housing having a hollow body portion rising above the level of and in alignment with said upwardly opening base and embodying vertical end walls having upper ends joined by a horizontal top wall directly above said base and opposed upwardly and inwardly sloping side walls, each side wall embodying a first fixedly mounted grid plate having a lower edge above the plane of said base and having electric heating coils on an inward side projecting into said hollow portion and projecting prongs on an exterior side capable of piercing and suspending strips of bacon, a cover opposed to and confronting an outwardly facing side of said grid plate and having a lower edge portion below the upper level of and hingedly mounted on said base, the upper edges of the aforementioned side walls of said base having integral outwardly flared lip portions, said cover embodying an inwardly opening tray having a main outer wall marginally encompassed by inwardly directed rim walls, the lower rim wall being provided with an inwardly directed grease deflecting flange resting atop the underlying lip flange and overhanging the coacting side wall of said grease pan in a manner to underlie said grid plate and direct and shunt the grease toward the well portion of said base, said cover containing and confining a filler of insulation material, the interior surface of said material having a second grid plate superimposed thereon and having heating coils interposed between said second grid plate and insulating filler, said second grid plate having an inwardly facing side provided with projecting prongs similar to the first-named prongs and capable of being moved toward and from said first prongs in a manner to position the bacon strips between the plates for simultaneously broiling both side of the strips of bacon, the aforementioned grease deflecting flange being oriented and aligned with the receptacle portion of said grease pan.

5. The device defined in and according to claim 4 and wherein said cover is adapted to be swung up toward said first plate an alternatively swung outwardly and away from said first plate to assume a horizontal loading position, the respective end portions of said cover having elevated selectively usable handgrips, the central exterior upper portion of said cover being provided with a fixed outstanding rest which is adapted to reside atop a table or other support surface when said cover is intentionally placed in a horizontal loading and unloading position.

References Cited

UNITED STATES PATENTS

| | | | |
|---|---|---|---|
| 267,535 | 11/1882 | Hurd | 99—372 |
| 1,706,612 | 3/1929 | Jaeger | 99—375 |
| 1,915,962 | 6/1933 | Vaughn | 99—372 |
| 2,080,171 | 5/1937 | Fairbanks et al. | 99—349 |
| 2,157,303 | 5/1939 | Penrose et al. | 99—349 XR |
| 3,010,383 | 11/1961 | Greene | 99—349 XR |
| 3,348,470 | 10/1967 | Swanson | 99—372 XR |
| 3,352,227 | 11/1967 | Litman | 99—402 XR |

WALTER A. SCHEEL, Primary Examiner

A. O. HENDERSON, Assistant Examiner

U.S. Cl. X.R.

99—390, 400, 425